(No Model.)

W. H. WOOLARD.
STEAM COOKER.

No. 430,980. Patented June 24, 1890.

WITNESSES
Walter H. Pumphrey
Van Buren Hillyard

INVENTOR
Wm. H. Woolard
By R. S. & A. W. Lacey
his Attorneys.

UNITED STATES PATENT OFFICE.

WILLIAM H. WOOLARD, OF WINDSOR, ILLINOIS.

STEAM-COOKER.

SPECIFICATION forming part of Letters Patent No. 430,980, dated June 24, 1890.

Application filed August 7, 1889. Serial No. 320,041. (No model.)

*To all whom it may concern:*

Be it known that I, WILLIAM H. WOOLARD, a citizen of the United States, residing at Windsor, in the county of Shelby and State of Illinois, have invented certain new and useful Improvements in Steam-Cookers; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to steam-cookers, and has for its object to provide a culinary apparatus in which the food can be inspected at any point without removing the vessel in which it is contained from its support, and in which little if any steam will be permitted to escape, whereby a saving of fuel will result and the flavors of the food be retained.

The improvement consists of the novel features which will be hereinafter more fully described and claimed, and which are shown in the annexed drawings, in which—

Figure 1:
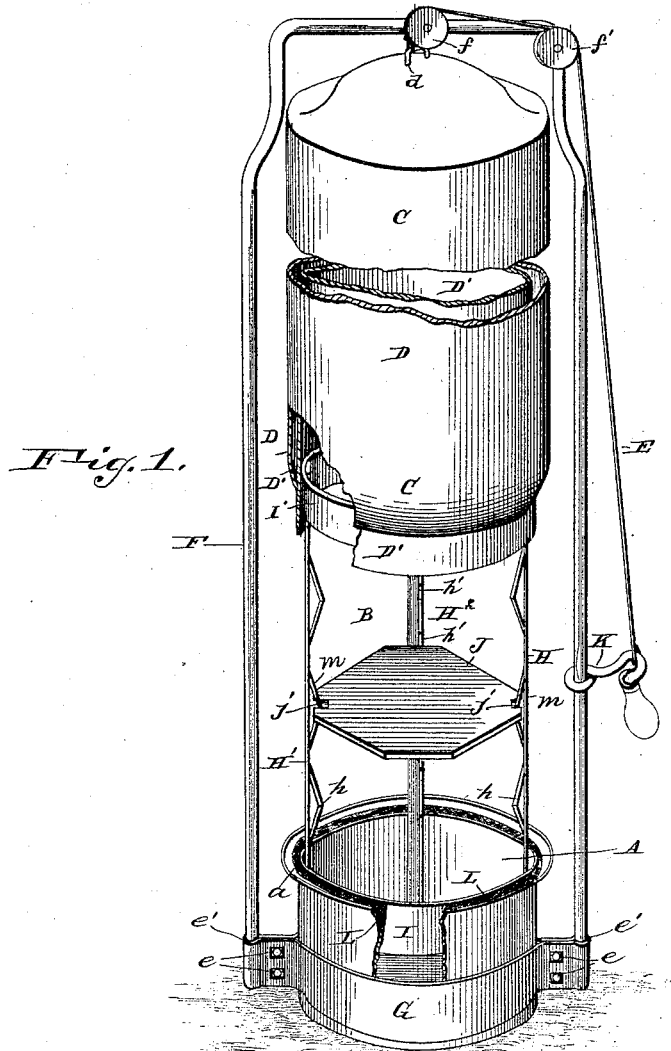
Figure 2:
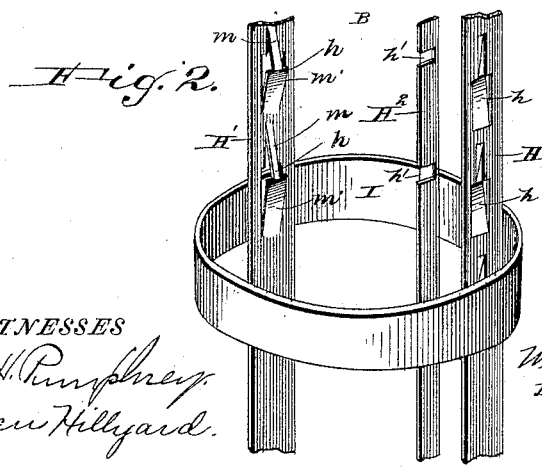

Figure 1 is a perspective view, parts being broken away, of a steam-cooker embodying my invention, showing the hood up. Fig. 2 is a detail perspective view of the lower portion of the rack-frame on an enlarged scale.

The reservoir A, in which the shelf-rack B is placed and covered by the hood C, is made with a substantial bottom and sides, the latter being the proper depth and having a flaring or funnel-shaped rim $a$, which receives the lower end of the hood C. The hood is made the proper size to cover the rack-frame and is composed of an inner and an outer casing. The outer casing D is slipped down over the inner casing D', the two cases being of such relative size that about a quarter of an inch space intervenes between them. Each casing is made independent of the other and has a separate top. The bottom of the outer casing is securely fastened to the inner casing near its lower end in such manner that the space between the two casings is rendered air-tight. The hood C is provided with a handle $d$ on the top, to which a cord E is attached, or which may be used in removing the hood from the cooker at any time.

The guide-yoke F is made of gas-pipe or other suitable material, and is fastened to the reservoir A by means of an iron band G, which is held securely to the reservoir and guide-yoke by means of bolts $e$. Loops $e'$ are formed in the band at points diametrically opposite each other, and the lower ends of the yoke are inserted in these loops, and the bolts $e$ passing through the loops clamp the band on the yoke and reservoir, as will be readily understood.

The shelf-rack B is made to support any desired number of shelves J, which latter can be adjusted or removed to admit a larger or taller vessel to the interior of the steamer, or to admit any kind of a cooking-vessel that will fit within the hood C, and is composed of three upright bars H, H', and $H^2$ and two bands I and I'. The two side bars H and H' have the requisite number of shelf-supports $h$, which are pressed or swaged from the body of the bars and which are in the shape of an inverted T, substantially as shown. The back upright bar $H^2$ is provided with a corresponding number of notches $h'$, cut therein to a proper depth to receive the shaft J and support it in the proper position. The three upright bars H H' $H^2$ are held in their proper position at the bottom end by being riveted or otherwise fastened to the lower band I, which fits on the inside of the reservoir and at the top by being riveted to the band I'.

The shelf-supports $h$ comprise two members $m$ and $m'$, which incline in opposite directions from their adjacent ends. The member $m'$ is considerably broader or wider than the member $m$, so as to form shoulders on each side of member $m$ for the shelves to rest on, and inclines away from the support, whereas the member $m$ inclines from the member $m'$ toward the said support and braces and strengthens the member $m'$, besides forming a means to hold the shaft from lateral displacement, in that it enters the notch $j$ in the edge of the said shelf.

The shaft J is preferably an octagonal-shaped piece of sheet-iron of proper size, having slots J of proper depth cut in two diametrically-opposite sides, so they will straddle the inverted-T supports $h$, or the members $m$ thereof, and is of such size that it will fit in the notch of the back upright bar $H^2$.

The cord E, attached to the handle d on the hood, as aforesaid, passes over the two pulleys f and f' on the guide-yoke, and is attached at its other end to the combined handle and clamp K, which is mounted on the guide-yoke, and is used in operating the said hood and maintaining it at any height desired simply by letting loose of the handle. Should the handle slip out of the operator's hand, it will immediately grip the guide-yoke and not allow the hood to fall.

The packing L, for preventing the escape of steam between the reservoir and the hood, consists of candle-wicking or common soft muslin, and is pressed around between the top or funnel-shaped part of the reservoir and the lower band I of the rack-frame.

The operation of the cooker is as follows: The steam is generated in the reservoir from water which is placed therein for the purpose, and, rising, fills the hood when the latter is lowered and cooks the food that is placed on the rack-frame, as will be readily understood.

Having thus described my invention, what I claim, and desire to secure by Letters Patent, is—

1. The combination, with a reservoir provided with a dish-supporting rack, of a hood composed of an inner and an outer casing having an air-space between them, the outer casing being securely fastened at its lower end to the inner casing, substantially as and for the purpose described.

2. The combination, with the reservoir and the band I, of the packing placed in the space between the said band and reservoir and the hood adapted to have its lower end fitted in said space, substantially as set forth.

3. The combination, with the reservoir, the hood, and the yoke, of the cord attached to the hood and passed over a pulley on the yoke, and the combined handle and clamp mounted on the yoke, substantially as and for the purpose described.

4. The combination, with the reservoir and the guide-yoke, of the band G, encircling the reservoir, and having portions folded on itself to form loops, and having the ends of the yoke inserted in said loops, and the bolts passing through the said folded portions to clamp the loops on the yoke and the band on the reservoir, substantially as described.

In testimony whereof I affix my signature in presence of two witnesses.

WM. H. WOOLARD.

Witnesses:
H. R. MOBERLEY,
T. L. ROSE.